United States Patent
Hatazawa et al.

(10) Patent No.: US 6,506,523 B1
(45) Date of Patent: Jan. 14, 2003

(54) SOLID ELECTROLYTE SECONDARY BATTERY

(75) Inventors: Tsuyonobu Hatazawa, Miyagi (JP); Takayuki Kondo, Miyagi (JP); Yukiko Iijima, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/446,291

(22) PCT Filed: Apr. 22, 1999

(86) PCT No.: PCT/JP99/02156

§ 371 (c)(1), (2), (4) Date: Dec. 17, 1999

(87) PCT Pub. No.: WO99/56337

PCT Pub. Date: Nov. 4, 1999

(30) Foreign Application Priority Data

Apr. 27, 1998 (JP) .......................... P10-117551

(51) Int. Cl.$^7$ ............................ H01M 6/18
(52) U.S. Cl. ............................ 429/316
(58) Field of Search ............ 429/300, 303–306, 429/309, 316

(56) References Cited

U.S. PATENT DOCUMENTS

| 5,565,284 A | * | 10/1996 | Koga et al. |
| 5,607,485 A | * | 3/1997 | Gozdz et al. |
| 5,811,205 A | * | 9/1998 | Andrieu et al. |
| 5,922,493 A | * | 7/1999 | Humphrey, Jr. et al. |

FOREIGN PATENT DOCUMENTS

| JP | 6-243896 | 9/1994 |
| JP | 8-250127 | 9/1996 |
| JP | 9-115550 | 5/1997 |
| JP | 9-306544 | 11/1997 |
| JP | 11-3729 | 1/1999 |
| JP | 11-67274 | 3/1999 |
| JP | 11-111265 | 4/1999 |
| WO | WO-98/38687 | * 9/1998 |

OTHER PUBLICATIONS

Kim et al., Electrochima Acta 45 (2000) pp. 2101–2109. (No Month).*

Atofina Data Sheets for KYNAR PVDF for Lithium Batteries, pp. 10, 12, and 14. (No Date Available).*

* cited by examiner

*Primary Examiner*—Carol Chaney
*Assistant Examiner*—Susy Tsang-Foster
(74) *Attorney, Agent, or Firm*—Sonnenschein, Nath & Rosenthal

(57) ABSTRACT

A solid-electrolyte secondary battery is provided which comprises a positive electrode, negative electrode and a solid electrolyte provided between the electrodes. The solid electrolyte contains as a matrix polymer a vinylidene fluoride/hexafluoropropylene block copolymer. The film of the block copolymer has a high mechanical toughness and solvent retaining capability. Use of this block copolymer film as the matrix polymer of the solid electrolyte greatly improves the adhesive strength, load characteristic and low-temperature performance. In the block copolymer, the proportion of hexafluoropropylene should preferably be 3 to 7.5% by weight. The molecular weight should preferably be of over 550,000. A block copolymer of over 300,000 in Mw and under 550,000 in Mw is used in combination with the above one.

12 Claims, 2 Drawing Sheets

SOLID ELECTROLYTE SECONDARY BATTERY

The present invention relates to a solid-electrolyte secondary battery having a solid electrolyte (also a gel electrolyte) disposed therein between a positive electrode and negative electrode, and more particularly, to a novel solid-electrolyte secondary battery improved in charge and discharge cycle life, volumetric energy density, load characteristic at low temperature, productivity, etc.

BACKGROUND OF THE INVENTION

In recent years, many portable electronic apparatuses such as an integral VTR/video camera unit, portable telephone, portable computer, etc. have been proposed, and they show a tendency to be more and more compact for their improved portability. Many developments and researches have been made to provide a thinner or bendable battery, more specifically, a secondary battery, or a lithium ion battery among others, for use as a portable power source in such a more compact portable electronic apparatus.

To attain such a thinner or bendable battery structure, active researches have been made concerning a solidified electrolyte for use in the battery. Especially, a gel electrolyte containing a plasticizer and a polymeric solid electrolyte made from a high molecular material having lithium salt dissolved therein are attracting much attention from many fields of industry.

As the high molecular materials usable to produce a high molecular solid electrolyte, a silicone gel, acryl gel, acrylonitrile, polyphosphazen-modified polymer, polyethylene oxide, polypropylene oxide, their composite polymer, cross-linked polymer, modified polymer, etc. have been reported. In the conventional secondary battery using a solid electrolyte made from one of these high molecular materials, however, since the electrolyte film has no sufficient film strength and adhesion to the battery electrodes, there occurs a nonuniformity between the charge and discharge currents, and a lithium dendrite easily takes place. Thus, the conventional secondary battery has a short charge and discharge cycle life (number of charge and discharge cycles), namely, it is critically disadvantageous in that it cannot meet the requirement "stable usability for a longer term" being one of the basic and important requirements for production of a commercial article.

Further, for a higher film strength of a solid electrolyte, it has been proposed to cross-link a trifunctional polyethylene glycol and diisocyanate derivative by reaction between them (as disclosed in the Japanese Unexamined Patent Publication No. 62-48716) or to cross-link polyethylene glycol diacrylate by polymerization (as disclosed in the Japanese Unexamined Patent Publication No. 62-285954). Because an unreacted substance or a solvent used for the reaction remains, the electrolyte has no sufficient adhesion to the battery electrodes. Moreover, the indispensable process of drying removal causes the productivity to be low. These methods are required for a further improvement.

As mentioned above, the high molecular solid or gel electrolyte has excellent characteristics not found with the liquid electrolytes, but when it is used in a battery, it can hardly be put in ideal contact with the battery electrodes. This is because the solid or gel electrolyte will not flow as the liquid electrolyte.

The contact of the high molecular solid or gel electrolyte with the battery electrodes has a large influence on the battery performance. Namely, if the contact between them is poor, the contact resistance between the high molecular solid or gel electrolyte and the battery electrodes is large so that the internal resistance of the battery is large. Furthermore, there cannot be an ideal ion movement between the high molecular solid or gel electrolyte and the electrodes, and so the battery capacity is also low. If such a battery is used for a long term, there occurs a nonuniformity between the charge and discharge currents and a lithium dendrite is likely to take place.

Therefore, in a battery using a high molecular solid or gel electrolyte, it is extremely important to adhere the high molecular solid or gel electrolyte to active material layers of electrodes of the battery with a sufficient adhesive strength.

To implement the above, it has been proposed as in the Japanese Unexamined Patent Publication No. 2-40867 to use a positive electrode composite in which a high molecular solid electrolyte is added to a positive active material layer of the positive electrode. In the battery disclosed in the Japanese Unexamined Patent Publication, a part of the high molecular solid electrolyte is mixed in the positive active material layer to improve the electrical contact between the high molecular solid electrolyte and positive-electrode active material layer.

However, in case the method disclosed in the Japanese Unexamined Patent Publication No. 2-40867 is adopted, the positive-electrode composite to which the high molecular solid electrolyte is added must be used to produce a positive plate and the high molecular solid electrolyte should be laminated on the positive plate. No ideal contact can be attained between the positive plate and solid electrolyte. More specifically, if a solid electrolyte having an irregular surface is laminated on an electrode layer, no good adhesion between them can be ensured and the internal resistance will be increased, with a result that the load characteristic becomes worse. Also, a positive or negative electrode composite in which a high molecular solid or gel electrolyte is added cannot easily be pressed to a sufficient extent because of the elasticity of the high molecular solid or gel electrolyte, and the grain spacing inside the composite is large, with a result that the internal resistance is increased. Also in this case, the load characteristic becomes worse. Furthermore, to prevent an electrolyte salt contained in the high molecular solid or gel electrolyte from being dissolved, the positive or negative electrode should be produced at a low humidity, their quality cannot easily be controlled, and the manufacturing costs are large.

Also, it has been proposed to use a copolymer produced by copolymerization of 8 to 25% by weight of hexafluoroethylene with the fluorocarbon polymer in order to improve the load performance and low- temperature performance. However, the addition of the hexafluoroethylene in such an amount will lower the crystallization temperature of the polymer, thus resulting in a deteriorated film strength.

Thus, the action to isolate the positive and negative electrodes from each other is considerably decreased. If the film thickness is not as large as 100 $\mu$m or so, a short-circuit will arise between the electrodes. Such a large film thickness will not provide a necessary volumetric energy density for the battery as a commercial article. Therefore to reduce the film thickness for a desired volumetric energy density, a third means for reinforcing the film strength should be used, which will add to the manufacturing labor and costs.

For the same reason, the maximum amount of an electrolyte is 70% by weight. If a large amount is added, the electrolyte cannot keep the form of a film but it will take the form of a sol. This will be the performance limit of the battery and it is difficult to ensure a sufficient load performance and low-temperature performance.

SUMMARY OF THE INVENTION

Accordingly, the present invention has an object to overcome the above-mentioned drawbacks of the prior art by providing a solid electrolyte excellent in adhesion to the active material layers of the electrodes, and thus providing a solid-electrolyte secondary battery using therein the solid electrolyte to ensure a good electrical contact between the solid electrolyte and active material layers of a positive electrode and negative electrode of the battery.

Also, the present invention has another object to provide a solid-electrolyte secondary battery having an improved charge and discharge cycle life and excellent in load characteristic, low-temperature performance and productivity.

To attain the above object, the Inventors have been made many researches for a long term. As a result of the researches, it has been found that the molecular structure of a fluorocarbon polymer used as a matrix polymer in the solid electrolyte has a great influence on the characteristics of the electrolyte, use of a vinylidene fluoride/hexafluoropropylene block copolymer makes it possible to adhere the high molecular solid or gel electrolyte with a sufficient adhesive strength to the active material layers of the electrodes, provide a good electrical contact between the solid or gel electrolyte and the active material of the positive and negative electrodes and ensure a sufficient film strength, and thus provide a solid-electrolyte secondary battery having a longer charge and discharge cycle life and excellent in load characteristic, low-temperature performance and productivity.

The solid-electrolyte secondary battery according to the present invention is completed based on the above findings by the Inventors and comprises a positive electrode and negative electrode and a solid electrolyte provided between the electrodes, the solid electrolyte containing as a matrix polymer a vinylidene fluoride/hexafluoropropylene block copolymer.

Note that the term "solid electrolyte" used herein refers to a so-called solid electrolyte as well as to a gel electrolyte in which a matrix polymer is plasticized by a plasticizer, for example. Therefore, the solid-electrolyte secondary battery of the present invention includes a gel-electrolyte secondary battery as well.

The present invention is essentially characterized in that a vinylidene fluoride/hexafluoropropylene block copolymer is used as a matrix polymer. The block copolymer assures an excellent adhesion of the electrolyte to the active material layers of positive and negative electrodes, and the properties of the individual monomers assure a sufficient toughness and solvent retention in combination. Therefore, it is possible to adhere the high molecular solid or gel electrolyte to the active material of the electrodes with a sufficient adhesive strength, retain a large amount of solvent (electrolyte) while maintaining a high film strength, and implement an improved charge and discharge cycle life, load characteristic and low-temperature performance.

In an embodiment, the present invention provides a solid-electrolyte secondary battery that comprises a positive electrode, a negative electrode and a solid electrolyte disposed between the positive and negative electrodes. The solid electrolyte comprises a vinylidene fluoride/hexafluoropropylene block copolymer as a matrix polymer.

In an embodiment, the vinylidene fluoride/hexafluoropropylene block copolymer comprises from about 3% to about 7.5% by weight hexafluoropropylene.

In an embodiment, the vinylidene fluoride/hexafluoropropylene block copolymer has a weight-average molecular weight of greater than 550,000.

In an embodiment, the vinylidene fluoride/hexafluoropropylene block copolymer comprises first components having a weight-average molecular weight of greater than 550,000, second components having a weight-average molecular weight of greater than 300,000 and third components having a weight-average molecular weight of less than 550,000.

In an embodiment, the solid electrolyte further comprises an electrolyte in an amount greater than 80% by weight.

In an embodiment, the negative electrode comprises a material into which a lithium ion can be inserted or from which a lithium ion can be extracted.

In an embodiment, the material into which a lithium ion can be inserted or from which a lithium ion can be extracted comprises a carbon material.

In an embodiment, the positive electrode comprises a composite oxide of lithium and a transition metal.

In an embodiment, the positive electrode comprises a face and the negative electrode comprises a face. The faces of the positive and negative electrodes are spaced apart from one another, the solid electrolyte sandwiched therebetween. The solid-electrolyte secondary battery further comprises a solution in which a solid electrolyte is dissolved and which impregnates the faces of the positive and negative electrodes.

These objects and other objects, features and advantages of the present intention will become more apparent from the following detailed description of the preferred embodiments of the present invention when taken in conjunction with the accompanying drawings.

Figure 1:
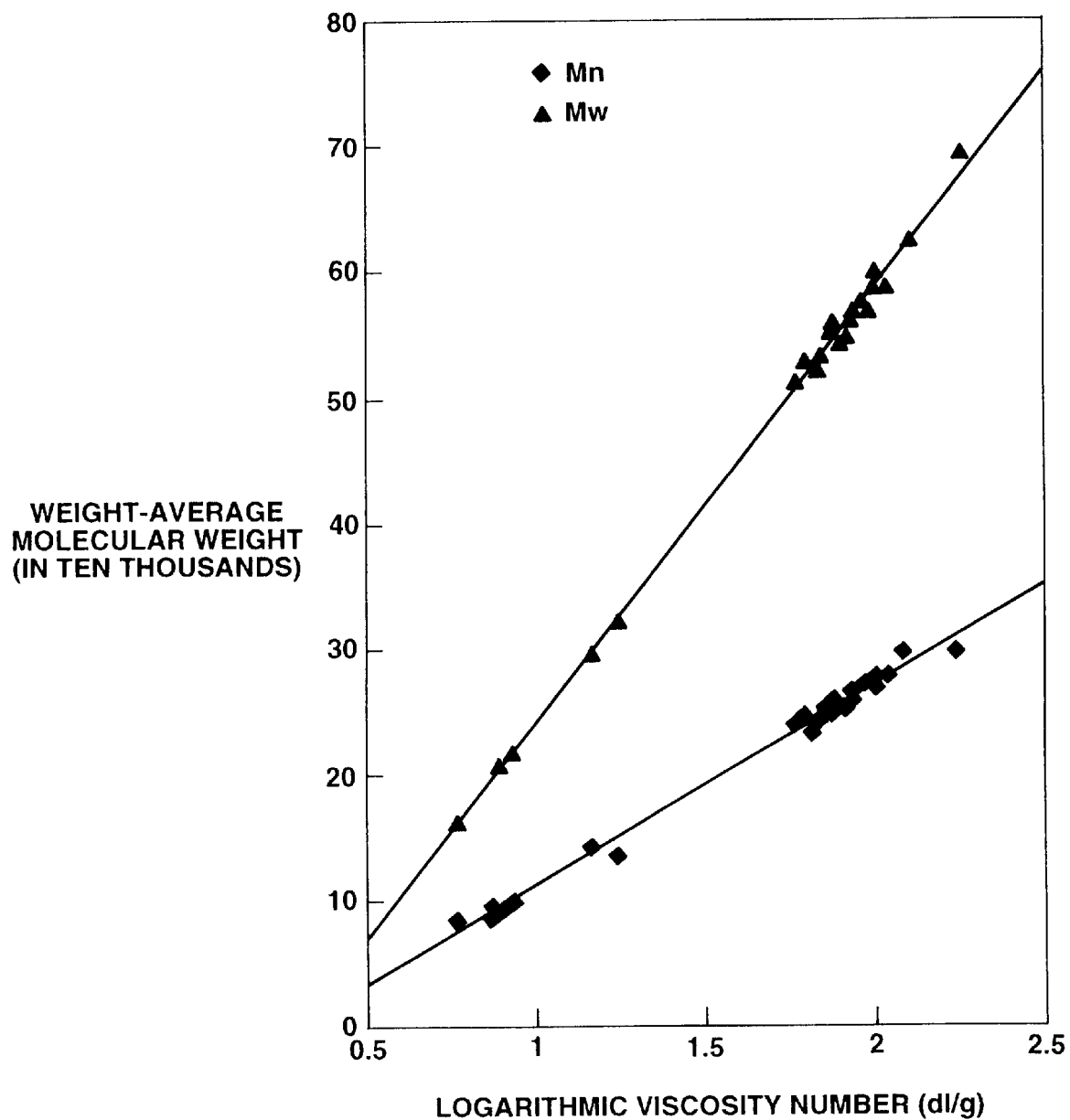
FIG. 1 illustrates, gradically the correlation between weight-average molecular weight (Mw), number-average molecular weight (Mn) and logarithmic viscosity number (dl/g)

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.;

DETAILED DESCRIPTION OF THE PRESENTLY PREFERRED EMBODIMENTS

The solid-electrolyte secondary battery according to the present invention uses as a matrix polymer a vinylidene fluoride/hexafluoropropylene block copolymer.

In a vinylidene fluoride/hexafluoropropylene copolymer synthesized to have a molecular weight equivalent to that of a polyvinylidene fluoride having a melting point of 175° C. as measured by a DSC (differential scanning calorimeter), a simple random polymerization will result in a combination of the crystallinity of the vinylidene fluoride and flexibility of the hexafluoropropylene and the melting point will be 130 to 140° C. as in the case when the crystallinity is lower.

However, the block copolymer reflects the properties of the individual monomers. For example, the crystallization by the vinylidene fluoride, for example, will not impair that of the block copolymer, and the melting point of the block copolymer is 150° C. or so which is near a middle point between the melting points of the respective monomers. Similarly, the flexibility of the hexafluoropropylene is maintained in the block copolymer. Thus, the block copolymer will keep a sufficient toughness owing to the crystallinity of the vinylidene fluoride and also a sufficient flexibility owing to that of the hexafluoropropylene.

Similarly, concerning the solvent (electrolyte) retention, the random polymerization provides only an improvement in solvent retention for a reduced crystallization point. If it is tried by such a random polymerization to retain a larger amount of solvent by using more than 8% by weight of the hexafluoropropylene, the film strength is considerably reduced, resulting in a sol state, so that the random polymer cannot keep its function as a solid or gel electrolyte.

The block copolymer keeps a sufficient toughness owing to the crystallinity, so that a high film strength can be maintained while large amount of solvent (electrolyte) is being retained. Even with a ratio, not so high, of the hexafluoropropylene, the block copolymer keeps a high solvent retaining capability.

The solid-electrolyte secondary battery according to the present invention shows an excellent load characteristic and low-temperature performance since the solid electrolyte can retain a large amount of solvent while maintaining a high film strength.

The proportion of hexafluoropropylene in the block copolymer may a one while will assure a necessary solvent retention and preferably within a range of 3 to 7.5% by weight. If the proportion of hexafluoropropylene is higher, the film strength may possibly be insufficient. If the proportion is under 3% by weight, the effect of improvement in solvent retaining capability due to the copolymerization of hexafluoropropylene will be insufficient so that no sufficient amount of solvent (electrolyte) can be retained.

The block copolymer used as the matrix polymer should have a weight-average molecular weight of 550,000 or more. If the block copolymer has a weight-average molecular weight of under 550,000, it may possibly provide no sufficient adhesive strength. Note that as the block copolymer has a weight-average molecular weight increased from 300,000, it has a gradually increased adhesive strength. However, the adhesive strength assured by a weight-average molecular weight under 550,000 cannot always be said to be sufficient. To ensure a sufficient adhesive strength, the weight-average molecular weight (Mw) should be over 550,000.

The block copolymer should desirably have a weight-average molecular weight of more than 550,000; however, for a weight-average molecular weight of more than 3,000,000, the polymer ratio has to be lowered to an impractical dilution ratio. The solid or gel electrolyte is produced by using, singly or as a component of the plasticizer, one of esters, ethers or carbonates usable in a battery to prepare a solution of the high molecular compound, electrolyte salt and solvent (and further a plasticizer for a gel electrolyte), impregnating the solution into a positive or negative electrode active material, and removing the solvent to solidify the electrolyte. Therefore, the esters, ethers or carbonates usable in the battery are limited of themselves. The esters, ethers or carbonates included in the limited range and having a weight-average molecular weight of more than 1,000,000 do not show a sufficient solubility to prepare a suitable solution.

Therefore, the weight-average molecular weight (Mw) of the block copolymer should preferably range from 550,000 to 3,000,000, and more preferably from 550,000 to 1,000,000.

In case a block copolymer of 550,000 or more in weight-average molecular weight (Mw) is used, another fluorocarbon of over 300,000 and under 550,000 in Mw may be used in combination to lower the viscosity for facilitating to form a film of the electrolyte. In this case, however, the ratio of the block copolymer of 550,000 or more in Mw should preferably be 30% or more by weight. If the ratio of the block copolymer of 550,000 or more in Mw is lower, it will be difficult to ensure an intended sufficient adhesive strength of the solid electrolyte.

The block copolymer of 550,000 or more in Mw is prepared by using a peroxide and polymerizing a monomer at a temperature ranging from room temperature to 200° C. and under an atmospheric pressure of 300 atm or less. It is industrially produced by the suspension polymerization or emulsion polymerization process.

In the suspension polymerization process, water is used as a medium, a dispersant is added to the monomer to disperse the latter as liquid drops into the medium, the organic peroxide dissolved in the monomer is polymerized as a polymerization initiator.

Also, during suspension polymerization of the monomer in the medium in the presence of an oil-soluble polymerization initiator (will be referred to as "initiator" hereinunder), a monomer selected from hexafluoropropylene, ethylene tetrafluoride, etc. may be used as a copolymer component in 3 to 7.5% by weight of all the monomers to provide a copolymer.

A chain transfer agent used at this time includes acetone, isopropyl acetate, ethyl acetate, diethyl carbonate, dimethyl carbonate, baked ethyl carbonate, propionic acid, trifluoroacetic acid, trifluoroethyl alcohol, formaldehyde dimethyl acetal, 1, 3-butadiene epoxide, 1, 4-dioxane, β-buthyl lactone, ethylene carbonate, vinylene carbonate or the like. Among them, however, acetone or ethylene acetate should preferably be used for the easy availability and handling.

The initiator may be any one of dinormalpropyl peroxidicarbonate (NPP), diisopropyl peroxidicarbonate or the like. For each of the initiator and chain transfer agent, a kind and amount may be selected and one or more than two kinds be used in combination to attain a desired molecular weight.

The dispersant usable in the process of preparing the electrolyte may be any one of partially suspended polyvinyl acetate used in ordinary suspension polymerization, a water-soluble cellulose ether such as methyl cellulose, hydroxyethyl cellulose, hydroxypropyl cellulose, hydroxypropyl methyl cellulose or the like, a water-soluble polymer such as gelatin or the like, for example.

The water, monomer, dispersant, initiator, chain transfer agent and other auxiliaries may be charged in any manner which would be suitably used in ordinary suspension polymerization.

For example, the water, dispersant, initiator, chain transfer agent and other auxiliaries are charged, and then put under a reduced pressure for deaeration, the monomer is charged, and agitation of the mixture is started. After the mixture reaches a predetermined temperature, it is kept at that temperature for proceeding of the polymerization. When the conversion reaches, for example, 10 to 50%, the chain transfer agent is charged under pressure. The polymerization is further allowed to progress. When the conversion reaches 80% or more, for example, an unreacted monomer is recovered. Then the polymer is dehydrated, washed and dried to provide a polymer.

At this time, by controlling the timing of introducing vinylidene fluoride and hexafluoropropylene, that of introducing a chain transfer agent, polymerization temperature profile, pressure and reaction time, etc., a block copolymerized polymer can be provided.

Similarly, by controlling the temperature, pressure and reaction time appropriately at this time, it is possible to control the weight-average molecular weight of a block copolymer thus produced.

The block copolymer thus produced forms, together with the electrolyte salt and solvent (in addition, a plasticizer for a gel electrolyte), a solid or gel electrolyte. The electrolyte is provided between a positive electrode and negative electrode. At this time, the fluorocarbon polymer should preferably be impregnated in the state of a solution into the active material of the positive or negative electrode, and the solvent be removed for solidification of the electrolyte. Thereby a part of the electrolyte is impregnated into the active material of the positive or negative electrode to provide a higher adhesive strength which can ensure an improved adhesion of the electrolyte to the electrodes.

In the solid or gel electrolyte, the matrix polymer is used in 2 to 20% by weight and an ester, ether or a carbonate is used as one component of the solvent or plasticizer.

The solid or gel electrolyte contains a lithium salt which may be a one used in ordinary battery electrolytes. More particularly, the lithium salt may be a one selected from lithium chloride, lithium bromide, lithium iodide, lithium chlorate, lithium perchlorate, lithium bromate, lithium iodate, lithium nitrate, tetrafluoro lithium borate, hexafluoro lithium phosphate, lithium acetate, bis(trifluoromethane sulfonyl)imide lithium, $LiAsF_6$, $LiCF_3SO_3$, $LiC(SO_2CF_3)_3$, $LiAlCl_4$, $LiSiF_6$, etc.

These lithium salts may be used singly or in combination as mixed together, but among them, $LiPF_6$ and $LiBF_4$ should desirably be used for the oxidation stability.

The dissolution concentration of the lithium salt should preferably be 0.1 to 3.0 mols/liter in the plasticizer for a gel electrode, and more preferably 0.5 to 2.0 mols/liter.

The solid-electrolyte secondary battery according to the present invention can be constructed similarly to the conventional lithium ion secondary battery provided that it uses the above-mentioned solid or gel electrolyte.

That is, the negative electrode of a lithium ion battery may be made of a material into or from which lithium ion can be inserted or extracted. The material for the negative electrode may be, for example, a carbon material such as a carbon material difficult to be graphitized or a graphite material. More particularly, the material may be any one selected from carbon materials such as pyrocarbons, cokes (pitch coke, needle coke, petroleum coke), graphites, vitreous carbons, sintered organic high molecular compounds (phenol resin, furan resin or the like sintered at an appropriate temperature for carbonization), carbon fiber, activated charcoal and the like. In addition, it may be any one of materials into or from which lithium ion can be inserted or extracted, including high molecular compounds such as polyacetylene, polypropyl, etc., oxides such as $SnO_2$, etc. For forming a negative electrode from such a material, a well-known binder or the like may be added to the material.

The positive electrode may be formed from a metal oxide, metal sulfide or a special high molecular compound used as a positive electrode active material depending upon an intended type of battery. For a lithium ion battery, for example, the positive electrode active material may be a metal sulfide or oxide containing no lithium such as $TiS_2$, $MoS_2$, $NbSe_2$, $V_2O_5$ or the like, or a lithium composite oxide or the like containing as the base $LiMO_2$ (M is one or more kind of transition metal, and x differs depending upon the charged or discharged extent of the battery, normally over 0.05 and under 1.10). The transition metal M composing the lithium composite oxide should preferably be Co, Ni, Mn or the like. More particularly, the lithium composite oxides include $LiCoO_2$, $LiNiO_2$, $LiNiYCO_{i-y}O_2$ (O<y<1), $LiMn_2O_4$. These lithium composite oxides can be a positive electrode active material allowing to generate a high voltage and excellent in energy density. The positive electrode may be formed from more than one of these active materials. For forming a positive electrode from any of these active materials, a well-known conducting material, binder or the like may be added to the active material.

The battery according to the present invention is not limited to any special shape but may be designed to have a cylindrical, square or rectangular, coin, button or any other shape. Also, the battery according to the present invention may freely be dimensioned large, thin or otherwise.

The present invention will further be described herebelow concerning the experimental embodiments of the battery based on the experiment results.

Example of polymerizing conditions for fluorocarbon polymer

Following monomers and auxiliaries were charged into a pressure-resistant autoclave made of a stainless steel and having a volume of 14 liters, and the polymerization was started at a temperature of 25° C.:

| | |
|---|---|
| Vinylidene fluoride | 93 parts by weight (3,000 g) |
| Hexafluoropropylene | 7 parts by weight |
| Purified water | 300 parts by weight |
| Methyl cellulose | 0.1 part by weight |
| Soda pyrophosphate | 0.2 part by weight |
| NPP | 0.61 part by weight |

In 3 to 24 hours after start of the polymerization (when the conversion of 30 to 80% has been attained), 3.0 parts by weight of ethyl acetate was added to the mixture and the polymerization was allowed to proceed. When the internal pressure of the polymerization container decreased by 50% for example from the equilibrium pressure after the polymerization was started down, the unreacted monomer was recovered, a polymer slurry thus produced was dehydrated, washed and dried.

Confirmation of block copolymerization degree

A differential scanning calorimeter (DS C: TA10A by Metler) was used to heat a resin powder sample at a rate of 10° C./min from 30° C. in a nitrogen atmosphere and determine a DSC curve. A temperature at which the heat absorption due to the melting of the resin crystal reached a peak was taken as the melting point of the resin.

In a vinylidene fluoride/hexafluoropropylene block copolymer having a molecular weight equivalent to that of a polyvinylidene fluoride of which the melting point is 175° C. as measured by the DSC, the random copolymer showed a combination of a crystallinity of the vinylidene fluoride and a flexibility of the hexafluoropropylene, and had a melting point of 130 to 140° C. or so as in the case when the crystallinity is simply lowered. On the contrary, the block copolymer reflected the properties of the individual monomers. For example, the crystallilinity of the vinylidene fluoride was found not to impair the crystallinity of the block copolymer and the block copolymer showed a melting point of 150° C. or so which is near a middle point between the melting points of the individual monomers, namely, vinylidene fluoride and hexafluoropropylene, respectively.

Therefore, the difference in melting point assures the block copolymerization degree.

Molecular weight measurement a. Distribution of molecular weight (Mw/Mn)

A gel-permeation chromatograph (8010 series by Toso, with two columns TSK-GEL GMHXL of 7.8 mm in diameter, 300 mm in length, connected in series) was used to measure the weight-average molecular weight (Mw) of a dimethyl acetoamide solution in which the powder of the polymer obtained as in the above was dissolved at a concentration of 0.2% by weight at a temperature of 40° C. and flow rate of 0.8 ml/min.

b. Composition analysis of the polymer The composition was measured using $^{19}F$ NMR.

c. Logarithmic viscosity number

A Ubbelohde viscometer was used to measure an efflux time at 30° C. of a solution in which the powder of the polymer was dissolved in dimethyl formamide at a concentration of 4 g/liter. The following equation was used to calculate a logarithmic viscosity number from the measured efflux time:

Logarithmic viscosity number $[\eta]$ ln(rel)/C (dl/g) where
ηrel: Efflux time of sample solution/Efflux time of solvent
C: Concentration of sample solution (0.4 g/dl)

FIG. 1 shows the correlation between the measured weight-average molecular weight (Mw), number-average molecular weight (Mn) and logarithmic viscosity number.

Experimental embodiment 1

First, a negative electrode was prepared as in the following:

90 parts by weight of a crushed graphite powder and 10 parts by weight of vinylidene fluoride/hexafluoropropylene copolymer as a binder were mixed together to prepare a negative electrode mixture. The mixture was dispersed in N-methyl-2-pyrolidone to produce a slurry.

The slurry was applied uniformly to one side of a copper foil stripe of 10 μm in thickness, used as an anode collector. After the slurry was dried, the copper foil stripe was compressed and formed by a roll press to prepare a negative electrode.

On the other hand, a positive electrode was prepared as in the following:

To produce a positive electrode active material ($LiCoO_2$), lithium carbonate and cobalt carbonate were mixed at a ratio of 0.5 mol to 1 mol and sintered in the atmosphere at 900° C. for 5 hours. Ninety one parts by weight of the $LiCoO_2$ thus produced, 6 parts by weight of graphite as a conducting material and 10 parts by weight of vinylidene fluoride/hexafluoropropylene copolymer were mixed together to prepare a positive electrode mixture. The mixture was further dispersed in N-methyl-2-pyrolidone to produce a slurry. The slurry was applied uniformly to one side of an aluminum foil stripe of 20 μm in thickness used as an cathode collector. After the slurry was dried, the aluminum foil stripe was compressed and formed by the roll press to produce a positive electrode.

Further, a solid electrolyte (or gel electrolyte) was prepared as in the following:

The negative and positive electrodes were applied uniformly with a solution in which 30 parts by weight of a plasticizer composed of 42.5 parts by weight of ethylene carbonate (EC), 42.5 parts by weight of propylene carbonate (PC) and 15 parts by weight of $LiPF_6$, 10 parts by weight of the vinylidene fluoride/hexafluoropropylene block copolymer (containing hexafluoropropylene in 7.0% by weight as measured by NMR) being a matrix polymer of 600,000 in weight-average molecular weight (logarithmic viscosity number of 1.93) and 60 parts by weight of diethyl carbonate were mixed and dissolved. Thus, the solution was impregnated into the electrodes. The electrodes were left at normal temperature for 8 hours. Thereafter, the dimethyl carbonate was vaporized for removal to provide a gel electrolyte. At this time, the thickness of the gel electrolyte was 25 μm at both the positive and negative electrodes (the distance between the positive and negative electrodes joined to each other was taken as the thickness of the gel electrolyte layer).

The negative and positive electrodes applied with the gel electrolyte were superposed one on another for the gel electrolytes thereon to opposite to each other, and a pressure was applied to the electrodes, thereby preparing a flat gel-electrode battery of 2.5 cm by 4.0 cm in area and 0.3 mm in thickness.

Figure 2:
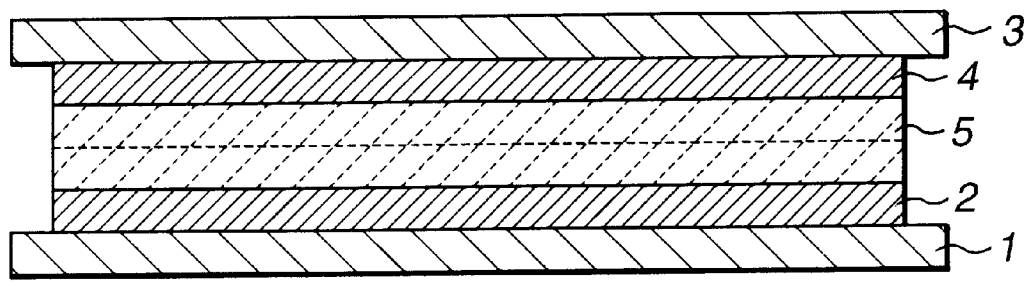
FIG. 2 is a sectional view of an experimental battery of the present invention.

FIG. 2 schematically illustrates the battery thus prepared. As seen, it comprises a negative electrode having an anode collector 1 on which an anode active material layer 2 was formed, a positive electrode having a cathode collector 3 on which a cathode active material layer 4 is formed, and a gel electrolyte 5 applied to the anode and cathode active material layers 2 and 4, respectively.

Experimental embodiment 2

A flat gel electrolyte battery was prepared in a similar manner to that in the experimental embodiment 1 having been described above except that 7 parts by weight of a vinylidene fluoride/hexafluoropropylene block copolymer of 700,000 in weight-average molecular weight (Mw) (content of the hexafluoropropylene was 7.0% by weight as measured by NMR) and 3 parts by weight of a vinylidene fluoride/hexafluoropropylene block copolymer of 300,000 in weight-average molecular weight (Mw) (content of the hexafluoropropylene was 7.0% by weight as measured by NMR) were used at a ratio of 7:3 as matrix polymers.

Comparative example 1

A flat gel electrolyte battery was prepared in a similar manner to that in the experimental embodiment 1 having been described above except that a vinylidene fluoride/hexafluoropropylene copolymer having a weight-average molecular weight (Mw) of 300,000 (content of the hexafluoropropylene was 7.0% by weight as measured by NMR) was used as a matrix polymer.

Comparative example 2

A flat gel electrolyte battery was prepared in a similar manner to that in the experimental embodiment 1 having been described above except that a polyvinylidene fluoride/hexafluoropropylene copolymer having a weight-average molecular weight (Mw) of 600,000 (content of the hexafluoropropylene was 7.0% by weight as measured by NMR) was used as a matrix polymer.

Comparative example 3

A flat gel electrolyte battery was prepared in a similar manner to that in the experimental embodiment 1 having been described above except that a vinylidene fluoride/hexafluoropropylene copolymer having a weight-average molecular weight (Mw) of 300,000 (ordinary random copolymer; content of the hexafluoropropylene was 7.0% by weight as measured by NMR) was used as a matrix polymer.

Evaluation

The experimental embodiments 1 and 2 and comparative examples 1 to 3 were tested on the peel strength, and further on the charge and discharge cycle life, shortr-circuit, load characteristic and low-temperature performance.

Figure 3:
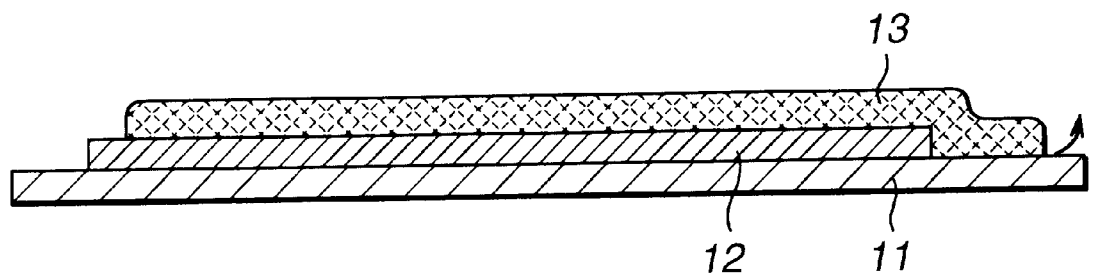
FIG. 3 is also a sectional view of the peel test equipment of the present invention.

The peel strength was measured as in the following. Namely, an electrode active material layer 12 was formed on an electric collector 11, and a gel electrolyte 13 was applied to the active material 13, as shown in FIG. 3. The test piece thus prepared was pulled in the direction of arrow (180°) with a weight of 500 g at a rate of 10 cm/sec or so. The test results are shown in Table 1 with a marking (0) for the breakage of the gel electrolyte 13 at the end of the electrode active material layer 12 and a marking (x) for the peeling of the gel electrolyte 13 and the electrode active material layer 12 from the boundary between them. The triangle symbol (Δ) refers to the partial peeling of the gel electrolyte 13 and an electrode active material 12 from a boundary between them.

On the other hand, the charge and discharge cycle test was done 500 cycles by discharging the theoretical capacity (0.5C) for 2 hours (hourly rate). Each of the batteries was evaluated as in the following.

Each battery was charged at a constant current and voltage at a temperature of 23° C. up to the upper limit of 4.2 V, and then discharged at a constant current (0.5C) down to an end voltage of 3.2 V. The discharge capacity was thus determined and evaluated with a discharge output maintenance factor after the 500 cycles of charge and discharge.

For the short-circuit test, 100 test batteries were prepared and they were charged and discharged for 500 cycles. Then the survival rate was measured.

The load characteristic was determined by charging each of the batteries at a constant current and voltage up to an upper limit of 4.2 V at 23° C., discharging the battery for a 1 hourly rate (1C), for a ½ hourly rate (2C) and for a ⅓ hourly rate (3C) at the constant current and voltage at an end voltage of 3.2 V. The discharging capacity was thus determined. A mean voltage was calculated from the discharging capacities. The output at each hourly rate was calculated in percentage with reference to ⅕C.

The low-temperature performance was evaluated at temperatures of 0° C., −10° C. and −20° C. At each of these temperatures, each battery was charged at a constant current and voltage at 23° C. up to 4.2 V, and discharged at a 2 hourly rate (½C) of the theoretical capacity at the constant current and voltage down to the end voltage of 3.2 V. A mean voltage was determined from the measurements, and further the output at the 2 hourly rate (½C) at each temperature was calculated in percentage with reference to a discharge at normal temperature.

The test results are also shown in Table 1. Table 1.

| | Peel strength | Discharge output maintenance factor (0.5C) after 500 cycles | Short-circuit | Load characteristic | | | Low-temperature performance | | |
|---|---|---|---|---|---|---|---|---|---|
| | | | | 1C | 2C | 3C | 0° C. | −10° C. | −20° C. |
| Embodiment 1 | ○ | 92% | 100/100 | 98 | 97 | 95 | 90 | 75 | 40 |
| Embodiment 2 | ○ | 93% | 100/100 | 99 | 98 | 96 | 92 | 78 | 45 |
| Comparative example 1 | Δ | 80% | 60/100 | 98 | 90 | 70 | 85 | 30 | 10 |
| Comparative example 2 | Δ | 60% | 20/100 | 97 | 90 | 50 | 85 | 30 | 15 |
| Comparative example 3 | x | 40% | 0/100 | 80 | 60 | 30 | 85 | 30 | 10 |

As apparent from Table 1, each of the experimental embodiments in which the block copolymer was used as a matrix polymer of a gel electrolyte was proved to have an excellent peel strength and output maintenance rate, no short-circuit, superior load characteristic and low-temperature performance.

As having been described in the foregoing, the present invention can provide a solid electrolyte excellent in adhesion to the electrode active material layers, and thus the present invention can also provide a solid-electrolyte secondary battery with a solid electrolyte having a good electrical contact with positive and negative active material layers and having a considerably improved charge and discharge cycle life.

Since the solid electrolyte in the solid-electrolyte secondary battery according to the present invention has a high mechanical toughness and a excellent solvent retaining capability, the battery is excellent in load characteristic and low-temperature performance.

From the above description, it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

What is claimed is:

1. A solid-electrolyte secondary battery comprising:
   (a) a positive electrode;
   (b) a negative electrode;
   (c) a solid electrolyte disposed between the positive and negative electrodes, the solid electrolyte comprising a vinylidene fluoride/hexafluoropropylene block copolymer as a matrix polymer, the electrolyte containing lithium salt, the salt having a dissolution concentration of 0.1 to 3.0 mols/ltr;
   (d) wherein the positive electrode comprises a face and the negative electrode comprises a face, the face of the positive electrode being spaced apart from the face of the negative electrode with the solid electrolyte sandwiched therebetween, the solid electrolyte further formed on either the positive and negative electrode faces, or both, the solid electrolyte layer being obtained by impregnating a solution containing a solvent in which the solid electrolyte is dissolved into the faces of either the positive or negative electrodes or both, and removing the solvent from the solution; and (e) wherein the vinylidene fluoride/hexafluoropropylene block copolymer comprises a first component having a weight-average molecular weight of greater than 550,000, a second component having a weight-average molecular weight of greater than 300,000 and less than 550,000.

2. The solid electrolyte secondary battery of claim 1, wherein the vinylidene fluoride/hexafluoropropylene block copolymer comprises from about 3% by weight to 7.5% by weight hexafluoropropylene.

3. The solid electrolyte secondary battery of claim 1, wherein the solid electrolyte further comprises an electrolytic solution, the electrolytic solution being 80% by weight or more in proportion thereof.

4. The solid-electrolyte secondary battery of claim 1, wherein the negative electrode comprises a material into which a lithium ion can be inserted or from which a lithium ion can be extracted.

5. The solid electrolyte secondary battery of claim 4, wherein said material comprises a carbon material.

6. The solid electrolyte secondary battery of claim 1, wherein the positive electrode comprises a composite oxide of lithium and a transition metal.

7. A solid-electrolyte secondary battery, comprising:

(a) a positive electrode;

(b) a negative electrode;

(c) a solid electrolyte disposed between the positive and negative electrodes, the solid electrolyte comprising a vinylidene fluoride/hexafluoropropylene block copolymer as a matrix polymer, the electrolyte containing lithium salt, the salt having a dissolution concentration of 0.1 to 3.0 mols/ltr;

(d) wherein the positive electrode comprises a face and the negative electrode comprises a face, the face of the positive electrode being spaced apart from the face of the negative electrode with the solid electrolyte sandwiched therebetween, the solid electrolyte further formed on either the positive and negative electrode faces, or both, the solid electrolyte layer being obtained by impregnating a solution containing a solvent in which the solid electrolyte is dissolved into the faces of either the positive or negative electrodes or both, and removing the solvent from the solution;

(e) wherein the vinylidene fluoride/hexafluoropropylene block copolymer comprises a first component having a weight-average molecular weight of greater than 550,000, a second component having a weight-average molecular weight of greater than 300,000 and less than 550,000;

(f) wherein the vinylidene fluoride/hexafluoropropylene block copolymer comprises from about 3% by weight to 7.5% by weight hexafluoropropylene;

(g) wherein the solid electrolyte further comprises an electrolytic solution, the electrolytic solution being 80% by weight or more in proportion thereof;

(h) wherein the negative electrode comprises a material into which a lithium ion can be inserted or from which a lithium ion can be extracted; and (i) wherein the positive electrode comprises a composite oxide of lithium and a transition metal.

8. A solid-electrolyte secondary battery, comprising:

(a) a positive electrode;

(b) a negative electrode;

(c) a solid electrolyte disposed between the positive and negative electrodes, the solid electrolyte comprising a vinylidene fluoride/hexafluoropropylene block copolymer as a matrix polymer, the electrolyte containing lithium salt, the salt having a dissolution concentration of 0.1 to 3.0 mols/ltr;

(d) wherein the positive electrode comprises a face and the negative electrode comprises a face, the face of the positive electrode being spaced apart from the face of the negative electrode with the solid electrolyte sandwiched therebetween, the solid electrolyte further formed on either the positive and negative electrode faces, or both, the solid electrolyte layer being obtained by impregnating a solution containing a solvent in which the solid electrolyte is dissolved into the faces of either the positive or negative electrodes or both, and removing the solvent from the solution;

(e) wherein the vinylidene fluoride/hexafluoropropylene block copolymer comprises a first component having a weight-average molecular weight of greater than 550,000, a second component having a weight-average molecular weight of greater than 300,000 and less than 550,000; and (f) wherein the vinylidene fluoride/hexafluoropropylene block copolymer comprises from about 3% by weight to 7.5% by weight hexafluoropropylene.

9. The secondary battery of claim 8, wherein (g) the solid electrolyte further comprises an electrolytic solution, the electrolytic solution being 80% by weight or more in proportion thereof.

10. The secondary battery of claim 8, wherein (g) the negative electrode comprises a material into which a lithium ion can be inserted or from which a lithium ion can be extracted.

11. The secondary battery of claim 8, wherein (g) wherein the positive electrode comprises a composite oxide of lithium and a transition metal.

12. The secondary battery of claim 8, wherein (g) the solid electrolyte further comprises an electrolytic solution, the electrolytic solution being 80% by weight or more in proportion thereof; and (h) the negative electrode comprises a material into which a lithium ion can be inserted or from which a lithium ion can be extracted.

* * * * *